(12) United States Patent
Tanaka

(10) Patent No.: US 12,153,672 B2
(45) Date of Patent: Nov. 26, 2024

(54) SECURITY MANAGEMENT SYSTEM AND SECURITY MANAGEMENT METHOD

(71) Applicant: Hitachi, Ltd., Tokyo (JP)

(72) Inventor: Mayuko Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 18/047,776

(22) Filed: Oct. 19, 2022

(65) Prior Publication Data

US 2023/0124144 A1    Apr. 20, 2023

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC .................. G06F 21/554; G06F 2221/033
USPC .................. 726/23; 709/223, 224
See application file for complete search history.

(56) References Cited

U.S. PATENT DOCUMENTS

| | | | | |
|---|---|---|---|---|
| 7,089,303 B2 * | 8/2006 | Sheymov | ............ | H04L 63/1408 709/224 |
| 12,045,341 B2 * | 7/2024 | Amano | ................. | G06F 21/554 |
| 2015/0294111 A1 * | 10/2015 | Thapliya | ................ | G06F 21/566 726/23 |
| 2017/0011409 A1 * | 1/2017 | Eager | .................. | G06F 16/9535 |
| 2017/0104790 A1 * | 4/2017 | Meyers | ................... | G06F 21/60 |
| 2022/0019661 A1 * | 1/2022 | Nagara | ................. | G06F 21/554 |

FOREIGN PATENT DOCUMENTS

JP    2017076884 A  *  4/2017
JP    2018-137500 A     8/2018

* cited by examiner

*Primary Examiner* — Liang Che A Wang
(74) *Attorney, Agent, or Firm* — BAKER BOTTS L.L.P.

(57) ABSTRACT

In a security management system, communication paths used for communication between business devices constituting a monitoring target system and a business communication importance which is information indicating an importance of each of the communication paths are stored, communication performed in the monitoring target system is monitored, when unauthorized communication performed in the monitoring target system is detected, a communication path used for the unauthorized communication is specified, and an influence range of the unauthorized communication on the monitoring target system is specified based on the specified communication path, the communication path having a possibility of being influenced when the countermeasure is implemented is specified, an influence value which is an index indicating a degree of influence of the countermeasure on the business is obtained, and whether or not to automatically implement the countermeasure is determined based on the influence value.

15 Claims, 8 Drawing Sheets

FIG. 6
BUSINESS DEVICE INFORMATION TABLE 211

| BUSINESS DEVICE ID | DEVICE NAME | IP ADDRESS | ALTERNATIVE DEVICE ID | AUTONOMOUS CONTROL PROPRIETY | BUSINESS ID |
|---|---|---|---|---|---|
| D01 | CONTROLLER 11A | 100.0.10.10 | NONE | POSSIBLE | 10 |
| D02 | CONTROLLER 11B | 100.0.10.20 | D03 | IMPOSSIBLE | 20 |
| D03 | CONTROLLER 11C | 100.0.10.30 | NONE | POSSIBLE | NONE |
| D04 | CONTROLLER 11D | 100.0.10.40 | D03 | POSSIBLE | 30 |
| D21 | ACTUATOR 12A | 100.0.10.1 | NONE | POSSIBLE | 10 |
| D22 | ACTUATOR 12B | 100.0.10.2 | NONE | IMPOSSIBLE | 20 |
| D31 | SENSOR 13A | 100.0.10.5 | NONE | POSSIBLE | 20 |
| D32 | SENSOR 13B | 100.0.10.6 | NONE | POSSIBLE | 20 |
| : | : | : | : | : | : |

FIG. 7
WHITE COMMUNICATION TABLE 212

| COMMUNICATION PATH ID | COMMUNICATION PROTOCOL | TRANSMISSION SOURCE ADDRESS | DESTINATION ADDRESS | TRANSMISSION SOURCE PORT | DESTINATION PORT | BUSINESS COMMUNICATION IMPORTANCE |
|---|---|---|---|---|---|---|
| WT001 | tcp | 100.0.10.10 | 100.0.10.1 | * | 502 | 1 |
| WT002 | tcp | 100.0.10.1 | 100.0.10.10 | 502 | * | 1 |
| WT003 | tcp | 100.0.10.20 | 100.0.10.2 | * | 502 | 0.5 |
| WT004 | tcp | 100.0.10.2 | 100.0.10.20 | 502 | * | 0 |
| : | : | : | : | : | : | : |

FIG. 8

BUSINESS INFORMATION TABLE 

| BUSINESS ID | BUSINESS NAME | OPERATING PERIOD | BUSINESS PRIORITY | UTILIZATION PATH | DEGENERATION RUNNING PROPRIETY |
|---|---|---|---|---|---|
| 10 | BUSINESS 10 | 9:00 – 17:00 | 1 | WT001, WT002 | POSSIBLE |
| 20 | BUSINESS 20 | 1:00 – 6:00 | 2 | WT003, WT004 | POSSIBLE |
| 30 | BUSINESS 30 | 9:00 – 17:00 | 3 | ... | IMPOSSIBLE |
| : | : | : | : | : | : |

FIG. 9

CONTROL INFORMATION TABLE 

| COMMUNICATION PATH ID | CONTROL PROTOCOL | CONTROL COMMAND | CONTROL PARAMETER | COMMUNICATION PERIOD | INFLUENCE |
|---|---|---|---|---|---|
| WT001 | ... | ... | ... | 10 ms | HIGH |
| WT002 | ... | ... | ... | 15 ms | HIGH |
| WT003 | ... | ... | ... | * | MEDIUM |
| : | : | : | : | : | : |

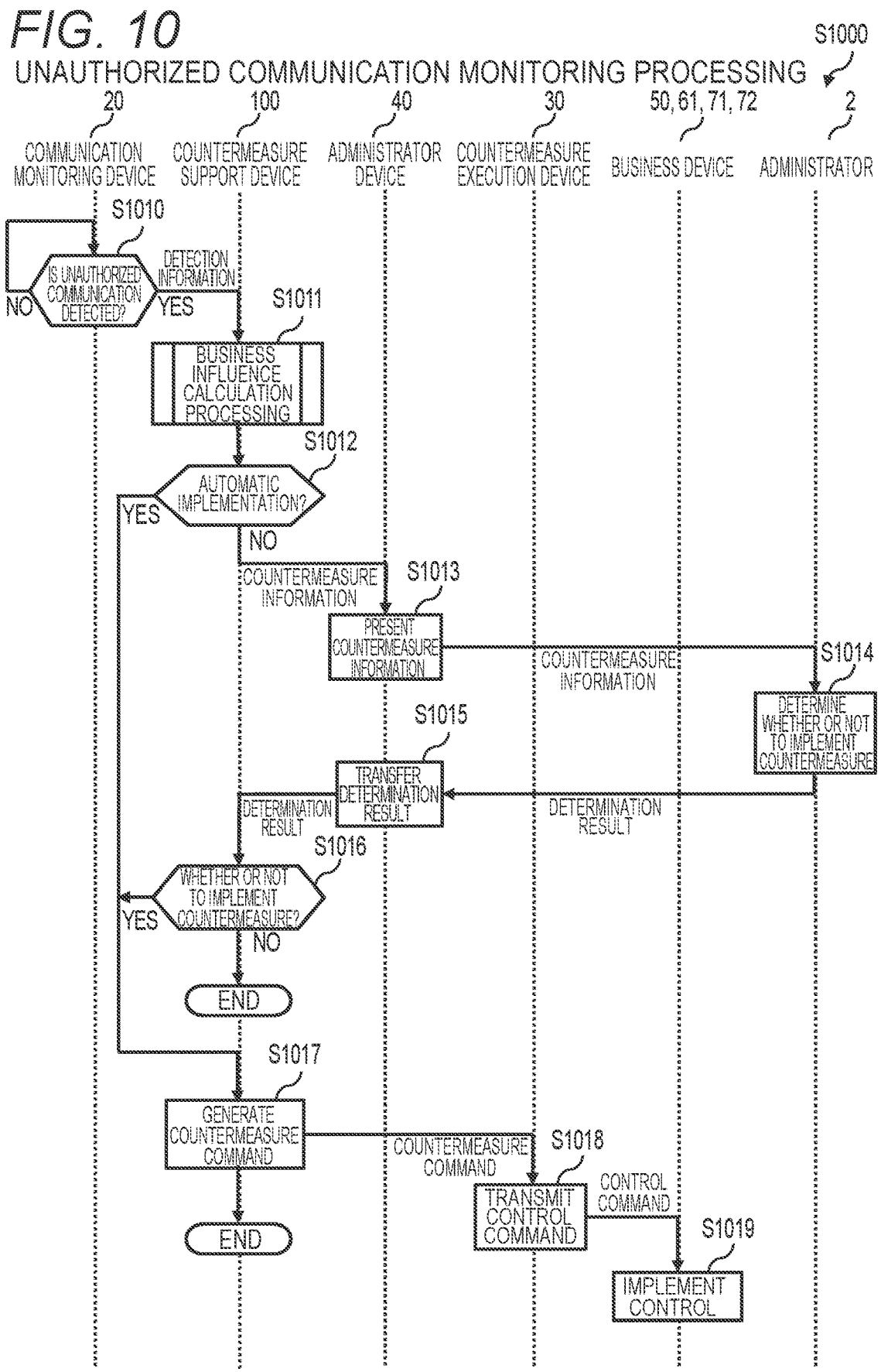

SECURITY MANAGEMENT SYSTEM AND SECURITY MANAGEMENT METHOD

CROSS-REFERENCE TO RELATED APPLICATION

This application claims priority pursuant to Japanese patent application No. 2021-171490, filed on Oct. 20, 2021, the entire disclosure of which is incorporated herein by reference.

BACKGROUND

Technical Field

The present invention relates to a security management system and a security management method.

Related Art

JP 2018-137500 A describes a security countermeasure design device configured to shorten an operation time from detection of an attack to a countermeasure of the attack for the attack occurring in a network and achieve an early countermeasure against the attack. The security countermeasure design device stores a countermeasure template for creating a security countermeasure against an attack, receives detection information of an attack from an attack detection device that detects an attack, extracts a countermeasure template corresponding to the detection information, creates security countermeasures based on the extracted countermeasure template and the detection information, extracts an implementable security countermeasure from among the created security countermeasures while referring to device information and topology information in a network, and outputs the extracted security countermeasure.

As described above, the security countermeasure design device described in JP 2018-137500 A presents, to an administrator, the implementable security countermeasure from among the security countermeasures created based on the countermeasure template and the detection information while referring to the device information and the topology information in the network.

However, it is necessary for the administrator to finally decide an intention indicating whether or not to implement the presented security countermeasure while considering an influence on a business, and there is a problem that a burden on the administrator is large. On the other hand, it can be said that it is preferable from the viewpoint of security countermeasures to quickly implement a security countermeasure that can allow the influence on the business.

SUMMARY

The present invention has been made in view of such a background, and an object of the present invention is to provide a security management system and a security management method capable of quickly implementing a necessary countermeasure against a security intrusion while reducing a burden on an administrator who performs security management.

One aspect of the present invention for achieving the above object is an information processing system (security management system) that performs security management of a monitoring target system including a plurality of business devices connected to communicate with each other. The security management system includes an information processing device that has a processor and a memory. Information indicating communication paths used for communication between the business devices and a business communication importance which is information indicating an importance of each of the communication paths are stored, communication performed in the monitoring target system is monitored, when unauthorized communication performed in the monitoring target system is detected, a communication path used for the unauthorized communication is specified, and an influence range of the unauthorized communication on the monitoring target system is specified based on the specified communication path, a countermeasure against the unauthorized communication is generated based on the specified influence range, the communication path having a possibility of being influenced when the countermeasure is implemented is specified, an influence value which is an index indicating a degree of influence of the countermeasure on the business is obtained based on the business communication importance of the specified communication path, and whether or not to automatically implement the countermeasure is determined based on the influence value.

In addition, the problem disclosed in the present application and the method for solving the problem will be clarified by the description of the preferred embodiments for carrying out the invention and the drawings.

According to the present invention, it is possible to quickly implement a necessary countermeasure against a security intrusion while reducing a burden on an administrator who performs security management.

BRIEF DESCRIPTION OF THE DRAWINGS

FIG. 6 is an example of a business device information table;

FIG. 7 is an example of a white communication table;

FIG. 8 is an example of a business information table;

FIG. 9 is an example of a control information table;

FIG. 10 is a flowchart for describing unauthorized communication monitoring processing;

DETAILED DESCRIPTION OF THE EMBODIMENTS

Hereinafter, an embodiment of the present invention will be appropriately described with reference to the drawings. The following description and drawings are examples for describing the present invention, and are appropriately omitted and simplified in order to clarify the description. The present invention can be implemented in other various forms. Unless otherwise limited, each component may be singular or plural.

In the following description, the same or similar components are denoted by the same reference signs, and redundant description may be omitted. In the following description, a letter "S" added before the reference sign means a processing step.

In the following description, various pieces of information may be described by using expressions such as a "table", but various pieces of information may be expressed by a data structure other than a table or list. "XX table" and the like may be referred to as "XX information" in order to indicate that these pieces of information do not depend on the data structure. When identification information is described, expressions such as "identification information", an "identifier", a "name", an "ID", and a "number" are used, but these pieces of information are interchangeable.

Figure 1:
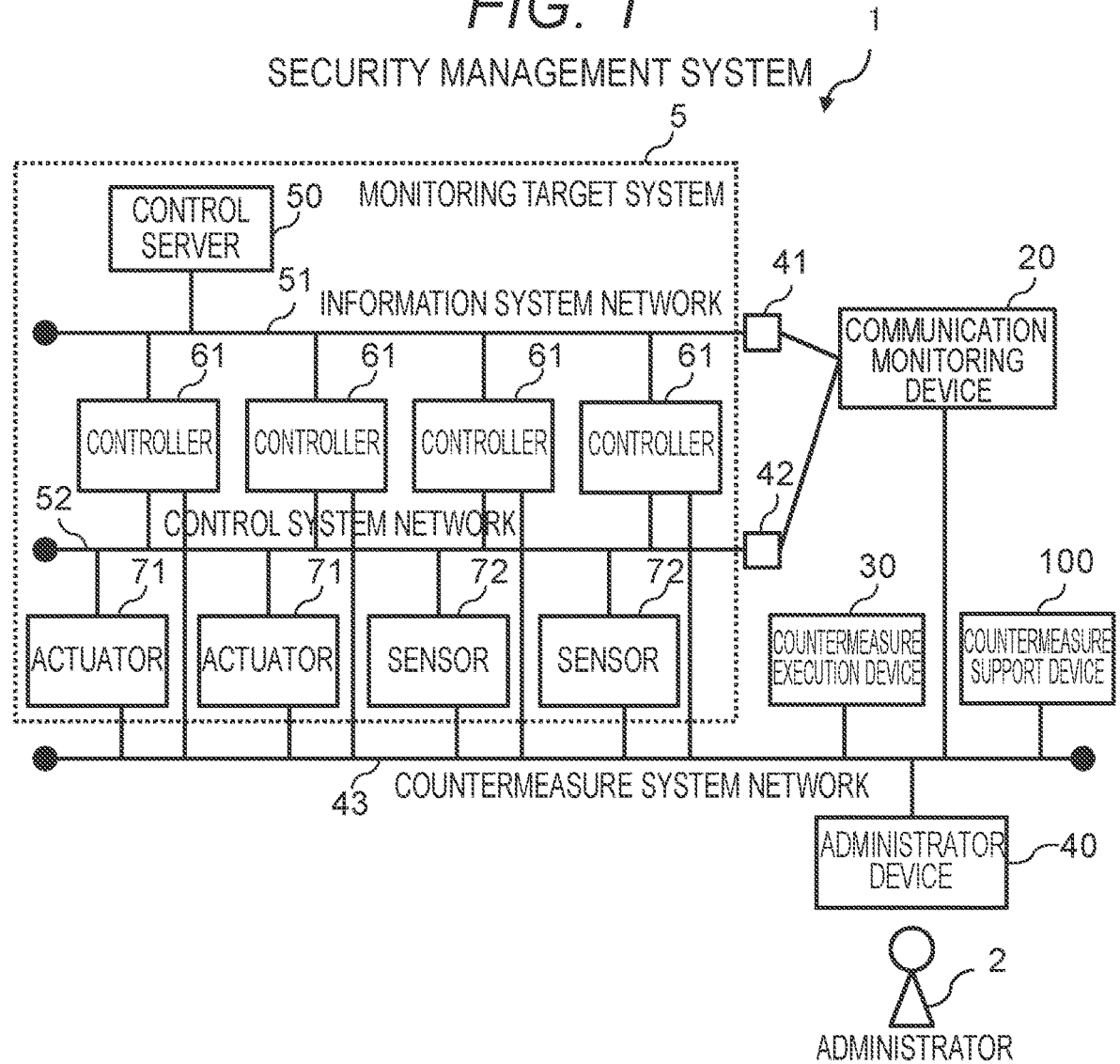
FIG. 1 is a diagram illustrating a schematic configuration of a security management system.

FIG. 1 illustrates a schematic configuration of an information processing system (hereinafter, referred to as a "security management system 1".) described as an embodiment. As illustrated in the drawing, a security management system 1 includes a monitoring target system 5, a communication monitoring device 20, a countermeasure execution device 30, an administrator device 40, and a countermeasure support device 100. The monitoring target system 5 may not be necessarily a component of the security management system 1. All the communication monitoring device 20, the countermeasure execution device 30, the administrator device 40, and the countermeasure support device 100 are constructed by using an information processing device (computer).

The security management system 1 has a function of generating a necessary security countermeasure (hereinafter, referred to as a "countermeasure".) against illegal communication (hereinafter, as "unauthorized communication".) detected in the monitoring target system 5 while considering an influence on a business performed by the monitoring target system 5 and automatically implementing the countermeasure when the influence on the business is allowable. According to the security management system 1, it is possible to reduce a burden on a person (hereinafter, referred to as an "administrator 2".) who monitors the monitoring target system 5 while maintaining continuity of a business.

The monitoring target system 5 is a so-called industrial network system. A type of the monitoring target system 5 is not necessarily limited, and is, for example, a factory Internet of Things (IoT) system, a smart factory, a social infrastructure system (a railway traffic system, a power receiving and transforming system, a water supply and sewerage system, a road system, a communication broadcasting system, or the like), or the like.

The illustrated monitoring target system 5 includes one or more controllers 61, one or more actuators 71, one or more sensors 72, and a control server 50. Hereinafter, these devices are collectively referred to as "business devices". The business device functions as an information processing device capable of bidirectional communication via a communication network.

The monitoring target system 5 includes information system network 51 and control system network 52, which are communication networks that connect components of the system to communicate with each other. When the monitoring target system 5 is, for example, a factory IoT system, the information system network 51 is, for example, a control network, and the control system network 52 is, for example, a field network.

The information system network 51 and the control system network 52 are wired or wireless communication networks, and are, for example, a local area network (LAN), a wide area network (WAN), the Internet, various public wireless communication networks, a dedicated line, and the like. All these communication networks are appropriately subjected to a certain level of security management such as use of encrypted communication or a virtual private network (VPN) and installation of a firewall or a demilitarized zone (DMZ).

As illustrated in the drawing, one or more controllers 61 and the control server 50 are connected to the information system network 51. Each controller 61, one or more actuators 71, and one or more sensors 72 are connected to the control system network 52 to communicate with each other.

The control server 50 and the controller 61 are connected via the information system network 51 in a state where bidirectional communication is enabled. The control server 50 monitors and controls operation states of the controller 61, the actuator 71, and the sensor 72 via the information system network 51. The control server 50 transmits, for example, a control instruction to the controller 61 via the information system network 51. The control server 50 receives, for example, information (a measurement value of the sensor or the like) sent from the controller 61 via the information system network 51, and monitors the state of each controller 61 based on the received information. The control server 50 functions as, for example, an engineering workstation (EWS), and performs, for example, change and update (version upgrade) of logic of a control program (firmware) executed in the controller 61.

The controller 61 is connected to the actuator 71 and the sensor 72 via the control system network 52 in a state where bidirectional communication is enabled. The controller 61 is, for example, a programmable logic controller (PLC), and performs, for example, rotation speed control and operation setting of a motor constituting the actuator 71, collection of the information output from the sensor 72, and the like via the control system network 52 in accordance with an instruction sent from the control server 50 via the information system network 51.

The actuator 71 causes a valve, a motor, an electric motor, or the like to function, for example, in accordance with a set value set based on a command from the controller 61. The sensor 72 measures, for example, physical quantities such as a temperature, a flow rate, and a pressure, and transmits measurement values to the controller 61 via the control system network 52.

The communication monitoring device 20 monitors communication in the information system network 51 (detection of unauthorized communication or the like) by acquiring communication (packet and communication telegraphic message) flowing through the information system network 51 via a mirror port 41 and analyzing the acquired information. The communication monitoring device 20 monitors communication in the control system network 52 (detection of unauthorized communication or the like) by acquiring contents of communication (packet and communication telegraphic message) flowing through the control system network 52 via a mirror port 42 and analyzing the acquired contents.

As illustrated in the drawing, all the communication monitoring device 20, the countermeasure execution device 30, the administrator device 40, and the countermeasure support device 100 are connected to each actuator 71 and each sensor 72 via a countermeasure system network 43 in a state where bidirectional communication is enabled.

The countermeasure execution device 30 is communicably connected to the monitoring target system 5 and the countermeasure support device 100 via the countermeasure system network 43. The countermeasure system network 43 is a wired or wireless communication network, and is, for example, a LAN, a WAN, the Internet, various public wireless communication networks, a dedicated line, or the like.

The countermeasure execution device 30 has a processing authority (control authority) to each business device of the monitoring target system 5. The countermeasure execution device 30 receives a countermeasure command sent from the countermeasure support device 100 via the countermeasure system network 43. The countermeasure execution device 30 causes the countermeasure business device to execute processing corresponding to the countermeasure (implementation of security countermeasure) by converting the received countermeasure command into, for example, a control command or a control logic program executable or processable by the countermeasure execution device 30, and transmitting the converted control command or control logic program (hereinafter, referred to as a "control command".) to the business device (hereinafter, referred to as a "countermeasure business device".) to which the countermeasure is applied.

The countermeasure support device 100 analyzes a business influenced by the unauthorized communication by using the information regarding the unauthorized communication (hereinafter, referred to as "detection information".) received from the communication monitoring device 20 and generates a countermeasure based on an analysis result. A magnitude of the influence of the countermeasure on the business (hereinafter, referred to as an "influence-on-business value".) is obtained, and it is determined whether or not the countermeasure can be automatically implemented based on the obtained influence-on-business value. When it is determined that the countermeasure can be automatically implemented, the countermeasure support device 100 generates a countermeasure command based on the countermeasure and transmits the generated countermeasure command to the countermeasure execution device 30.

The administrator device 40 presents the countermeasure received from the countermeasure support device 100 to the administrator 2 and accepts an input of an intention indicating whether or not to implement the countermeasure. Upon accepting the input of the intention, the administrator device 40 transmits the accepted contents to the countermeasure support device 100.

Figure 2:
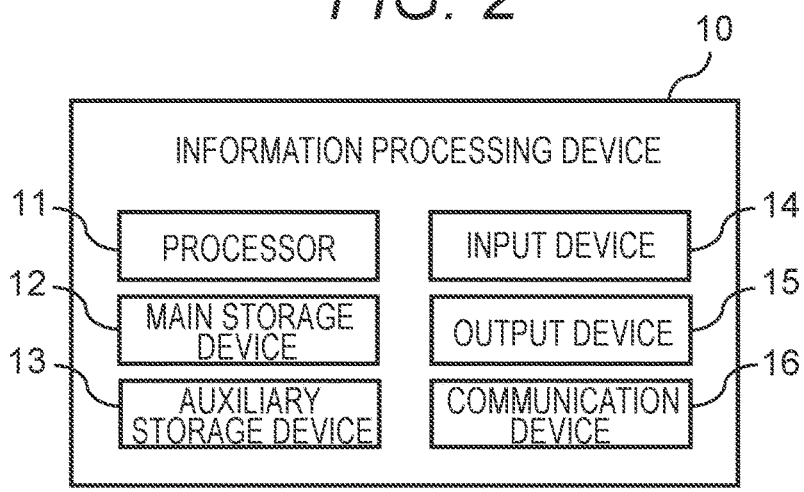
FIG. 2 is an example of an information processing device constituting the security management system.

FIG. 2 is a block diagram illustrating a hardware configuration example of the information processing device used for achieving the components (communication monitoring device 20, countermeasure execution device 30, administrator device 40, control server 50, and countermeasure support device 100) of the security management system 1. The illustrated information processing device 10 includes a processor 11, a main storage device 12 (memory), an auxiliary storage device 13, an input device 14, an output device 15, and a communication device 16. Examples of the information processing device 10 include a personal computer, an office computer, a server device, a smartphone, a tablet, a general-purpose device (main frame), and the like. Two or more components (communication monitoring device 20, countermeasure execution device 30, administrator device 40, control server 50, countermeasure support device 100) of the security management system 1 may be achieved by the common information processing device 10.

The information processing device 10 may be achieved in whole or in part by using virtual information processing resources provided by using a virtualization technology, a process space separation technology, or the like, for example, a virtual server provided by a cloud system. All or a part of functions provided by the information processing device 10 may be achieved by, for example, a service provided by a cloud system via an application programming interface (API) or the like. All or a part of the functions provided by the information processing device 10 may be achieved by using, for example, software as a service (SaaS), platform as a service (PaaS), infrastructure as a service (IaaS), or the like.

The processor 11 is achieved by using, for example, a central processing unit (CPU), a micro processing unit (MPU), a graphics processing unit (GPU), a field programmable gate array (FPGA), an application specific integrated circuit (ASIC), an artificial intelligence (AI) chip, or the like.

The main storage device 12 is a device that stores programs and data, and is, for example, a read only memory (ROM), a random access memory (RAM), a non-volatile memory (NVRAM), or the like. A function achieved in each component of the security management system 1 is achieved by the processor 11 reading and executing a program stored in the main storage device 12.

The auxiliary storage device 13 is, for example, a reading and writing device of a non-transitory recording medium such as a solid state drive (SSD), a hard disk drive, an optical storage device (compact disc (CD), digital versatile disc (DVD), or the like), a storage system, an IC card, an SD card, or an optical recording medium, a non-transitory storage area for a cloud server, or the like. The auxiliary storage device 13 can read programs and data from a non-transitory recording medium or another information processing device including a non-transitory storage device via the reading device of the recording medium or the communication device 16. The programs and data stored in the auxiliary storage device 13 are read into the main storage device 12 at any time.

The input device 14 is an interface that accepts inputs of information from the outside, and is, for example, a keyboard, a mouse, a touch panel, a card reader, a pen input type tablet, a voice input device, or the like.

The output device 15 is an interface that outputs various kinds of information such as processing progress and processing results to the outside. The output device 15 is, for example, a display device (liquid crystal monitor, liquid crystal display (LCD), graphic card, or the like) that visualizes the above-mentioned various kinds of information, a device (voice output device (speaker or the like)) that converts the above-mentioned various kinds of information into voice, or a device (printing device or the like) that converts the above-described various kinds of information into characters. For example, the information processing device 10 may be configured to input and output information to and from another device via the communication device 16.

The input device 14 and the output device 15 constitute a user interface that achieves interactive processing (acceptance of information, provision of information, and the like) with a user.

The communication device 16 is a device that achieves communication with other devices. The communication device 16 is a wired or wireless communication interface that achieves communication with other devices conforming to a predetermined communication protocol via various communication networks (information system network 51, control system network 52, and countermeasure system network 53), and is, for example, a network interface card (NIC), a wireless communication module, a USB module, or the like.

For example, an operating system, a file system, a database management system (DBMS) (relational database, NoSQL, or the like), a key-value store (KVS), or the like may be introduced in the information processing device 10.

Figure 3:
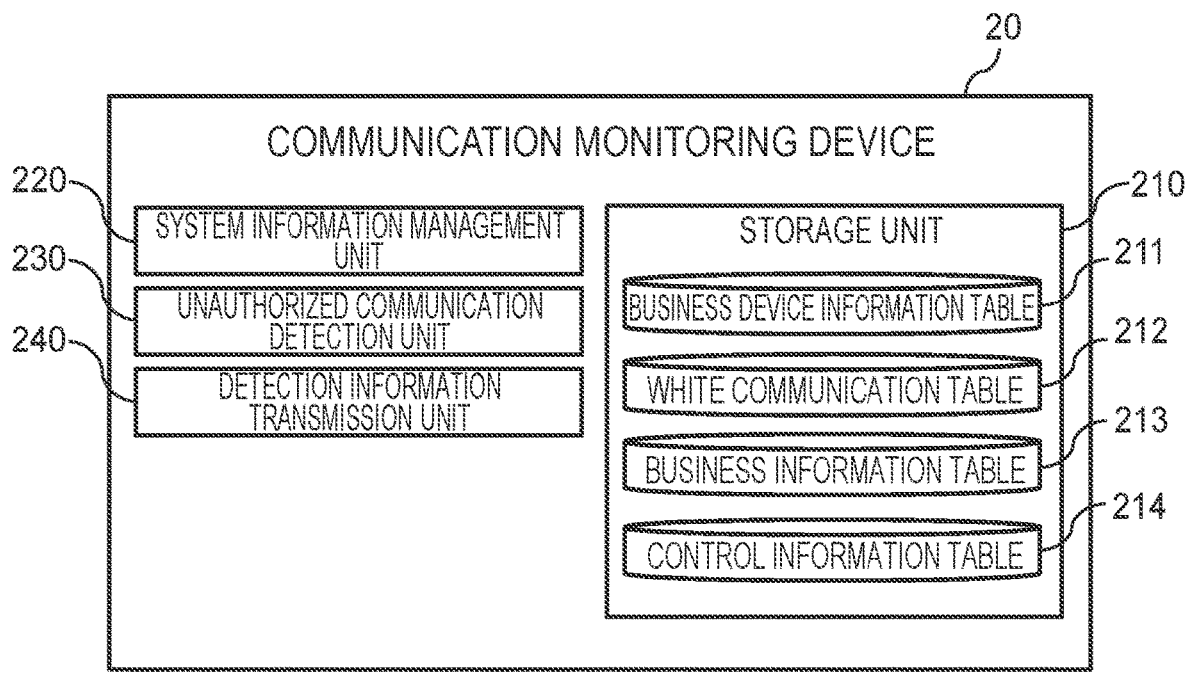
FIG. 3 is a block diagram for describing main functions of a communication monitoring device.

FIG. 3 is a block diagram illustrating main functions of the communication monitoring device 20. When unauthorized communication is detected by monitoring communication in the monitoring target system 5, the communication monitoring device 20 generates detection information of the detected unauthorized communication and transmits the generated detection information to the countermeasure support device 100.

As illustrated in the drawing, the communication monitoring device 20 has functions of a storage unit 210, a system information management unit 220, an unauthorized communication detection unit 230, and a detection information transmission unit 240.

Among the above functions, the storage unit 210 stores a business device information table 211, a white communication table 212, a business information table 213, and a control information table 214.

Among these tables, in the business device information table 211, information (hereinafter, referred to as "business device information".) regarding the business device is managed. The contents of the business device information table 211 are set by the administrator 2, for example.

FIG. 6 illustrates an example of the business device information table 211. As illustrated in the drawing, the business device information table 211 includes one or more records having items of a business device ID 611, a device name 612, an IP address 613, a substitute device ID 614, autonomous control propriety 615, and a business ID 616. One record in the business device information table 211 corresponds to one business device.

Among the above items, the business device ID 611 stores a business device ID that is an identifier of the business device. The device name 612 stores a name (device name) of the business device.

The IP address 613 stores a network address (IP address in this example) of the business device in the control system network 52. Although only the IP address in the control system network 52 is illustrated in the business device information table 211, an IP address of the communication network to which each of the business devices is connected is managed in the business device information table 211.

The substitute device ID 614 stores a business device ID (hereinafter, referred to as a "substitute device ID".) of another device (hereinafter, referred to as a "substitute device".) that can perform out the business instead of (in place of) the business device. When the business of the business device cannot be performed instead by another device or the substitute device is not prepared, "none" is stored in the substitute device ID 614.

The autonomous control propriety 615 stores information indicating whether or not the business device can perform autonomous running (can perform autonomous control). In this example, "possible" is stored in the autonomous control propriety 615 in a case where the autonomous driving is possible, and "impossible" is stored in the autonomous control propriety 615 in a case where the autonomous running is not possible. The "case where the autonomous control is possible" also includes a case where a business can be safely continued although there is an influence such as a decrease in business efficiency.

The business ID 616 stores an identifier (hereinafter, referred to as a "business ID".) of the business performed by the business device. "None" is stored in the business ID 616 of the business device of which the business device ID 611 is "D03" in the illustrated business device information table 211, which indicates that the business device is prepared as the substitute device and is currently in a standby state (the business is not performed). When the substitute device starts operating as a substitute destination thereafter, a business ID of a business performed by a business device as a substitute source of the substitute device is stored in the business ID 616 of the record.

Referring back to FIG. 3, in the white communication table 212, information indicating correspondences (hereinafter, referred to as "communication paths".) between nodes serving as transmission sources of information and nodes serving as transmission destinations (destinations) of information in normal communication performed in a business of the monitoring target system 5 (communication performed between the business devices when the business is executed) is managed. The communication path is identified (specified) by a combination of a protocol, an IP address, and a port used for communication. In the white communication table 212, information indicating an importance (hereinafter, referred to as a "business communication importance".) of each of the communication paths is managed. The contents of the white communication table 212 are set by the administrator 2, for example.

FIG. 7 illustrates an example of the white communication table 212. As illustrated in the drawing, the illustrated white communication table 212 includes one or more records having items of a communication path ID 711, a communication protocol 712, a transmission source address 713, a destination address 714, a transmission source port 715, a destination port 716, and a business communication importance 717. One record of the white communication table 212 corresponds to one of communication paths through which the business is performed via the information system network 51 or the control system network 52.

The communication path ID 711 stores an identifier (hereinafter, referred to as a "communication path ID".) of the communication path. Information indicating a communication protocol used in the communication path is stored in the communication protocol 712.

The transmission source address 713 stores a network address (IP address in this example) of a transmission source node of the communication path. The destination address 714 stores a network address (IP address in this example) of a destination node of the communication path.

The transmission source port 715 stores a port number of the transmission source node of the communication path. The destination port 716 stores a port number of the destination node of the communication path. "*" is stored in the transmission source port 715 or the destination port 716 for a communication path for which the transmission source port or the destination port is not designated (a communication path for which the port number is arbitrary).

The business communication importance 717 stores information indicating the business communication importance. In the present embodiment, the business communication importance takes a value in a range of "0" to "1" ("1" has a highest importance and "0" has a lowest importance). For example, when the business using the communication path is stopped when the communication path is interrupted, "1" is stored in the business communication importance 717. For example, when the communication path is for maintenance or when the communication path is a communication path used by one of the redundantly constructed sensors 72, "0" is stored in the business communication importance 717.

The business communication importance 717 is set in advance by the administrator 2.

Referring back to FIG. 3, in the business information table 213, information (hereinafter, referred to as "business information".) regarding the business performed in the monitoring target system 5 is managed. For example, the business information table 213 manages information such as an operation time length of each business, a priority of each business, communication performed in each business, and degeneration running propriety for each business.

FIG. 8 illustrates an example of the business information table 213. As illustrated in the drawing, the business information table 213 includes one or more records having items of a business ID 811, a business name 812, an operation time length 813, a business priority 814, a utilization path 815, and a degeneration running propriety 816. One record of the business information table 213 corresponds to one of businesses performed by the monitoring target system 5.

The business ID 811 stores a business ID of the business. In the business name 812, a name of the business (hereinafter, referred to as a "business name".) is stored.

The operation time length 813 stores information indicating a time length in which the business is performed.

The business priority 814 stores information indicating a priority (hereinafter, referred to as a "business priority".) of the business. In this example, the smaller a value of the business priority, the higher the priority.

The utilization path 815 stores a communication path ID of a communication path used when the business is executed.

In the degeneration running propriety 816, information indicating whether or not the business can perform degeneration running is stored. "Possible" is stored in the degeneration running propriety 816 when the degeneration running can be performed, and "impossible" is stored in the degeneration running propriety 816 when the degeneration running cannot be performed.

Referring back to FIG. 3, in the control information table 214, information (a control protocol, a control command, a control parameter, a communication period, an influence value, and the like; hereinafter, referred to as "control information".) regarding control performed between the business devices by using the communication path is managed.

FIG. 9 illustrates an example of the control information table 214. As illustrated in the drawing, the control information table 214 includes one or more records having items of a communication path ID 911, a control protocol 912, a control command 913, a control parameter 914, a communication period 915, and an influence degree 916. One record in the control information table 214 corresponds to one of the communication paths.

The communication path ID 911 stores a communication path ID of the communication path.

The control protocol 912 stores information indicating a control protocol used when the business device is controlled via the communication path.

Information indicating a control command used when the business device is controlled via the communication path is stored in the control command 913.

The control parameter 914 stores information indicating a control parameter used when the business device is controlled via the communication path.

The communication period 915 stores information indicating a communication period (which may be an average value of communication periods) of communication when the business device is controlled via the communication path. When the communication is not periodic communication, "*" is stored in the communication period 915.

The influence degree 916 stores a value (hereinafter, referred to as an "influence degree".) indicating a magnitude of the influence on the continuity and safety of the business when an abnormality occurs in the communication path (when the control command is no longer transmitted, when the number of control commands is rapidly increased, and when an invalid control parameter is set, or the like.). The contents of the influence degree 916 are used, for example, as a basis for setting the business communication importance 717. In this example, for example, one of "high", "medium", and "low" is set to the influence degree 916. For example, when there is a possibility that the business is stopped for several days or human life is threatened, or the like, and the influence on the business is great, "high" is stored in the influence degree 916. For example, when the influence is minor or limited, "low" is stored in the influence degree 916.

Referring back to FIG. 3, among the functions illustrated in the drawing, the system information management unit 220 manages the business device information table 211, the white communication table 212, the business information table 213, and the control information table 214 (hereinafter, there pieces of information are collectively referred to as "pieces of system information".).

The unauthorized communication detection unit 230 acquires contents of communication (packet and communication telegraphic message) flowing in the information system network 51 and the control system network 52 of monitoring target system 5 via the mirror port 41 and the mirror port 42. The unauthorized communication detection unit 230 analyzes the acquired contents of the communication, and acquires, for example, header information (IP addresses, communication protocols, port numbers, and the like of the device as the data transmission source and the device as the data transmission destination) of the packet and pieces of information (hereinafter, referred to as "communication information".) of the control command and the parameter included in a payload of the packet. The unauthorized communication detection unit 230 may generate information based on the acquired communication information (change in the number of communications per unit time, the number of control commands per unit time, and the like; hereinafter, referred to as "statistical information".). For example, the unauthorized communication detection unit 230 determines whether or not the unauthorized communication is being performed in the monitoring target system 5 by comparing the communication information and the statistical information (hereinafter, referred to as "analysis information".) with the information of each table stored in the storage unit 210.

When the unauthorized communication detection unit 230 determines that unauthorized communication is being performed in the monitoring target system 5, the detection information transmission unit 240 generates detection information and transmits the generated detection information to the countermeasure support device 100 via the countermeasure system network 43.

Figure 4:
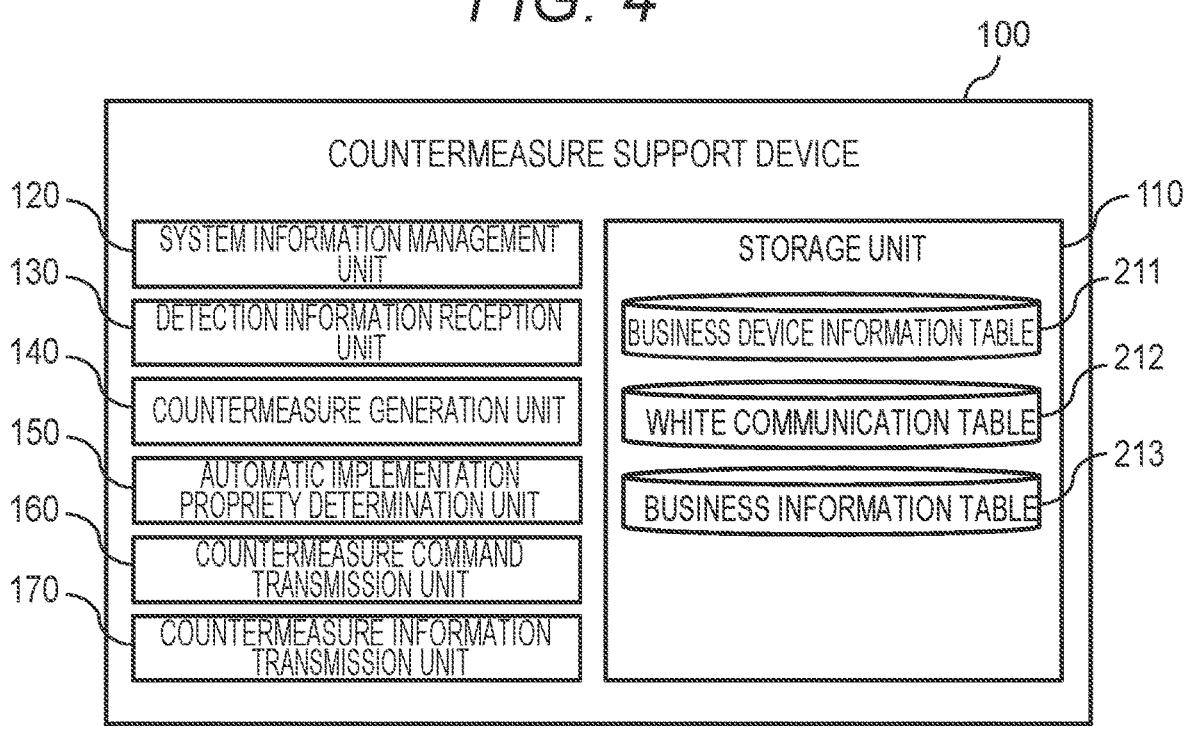
FIG. 4 is a block diagram for describing main functions of a countermeasure support device.

FIG. 4 is a block diagram for describing main functions of the countermeasure support device 100. Upon receiving the detection information from the communication monitoring device 20, the countermeasure support device 100 specifies a business having a possibility of being influenced by unauthorized communication of the detection information and generates a countermeasure against the unauthorized communication. The countermeasure support device 100 obtains an influence-on-business value which is an index indicating the influence on the business when the generated countermeasure is implemented, and determines whether or not the generated countermeasure can be automatically implemented based on the obtained influence-on-business value.

As illustrated in the drawing, the countermeasure support device 100 has functions of a storage unit 110, a system information management unit 120, a detection information reception unit 130, a countermeasure generation unit 140, an automatic implementation propriety determination unit 150, a countermeasure command transmission unit 160, and a countermeasure information transmission unit 170.

Among the above functions, the storage unit 110 stores a business device information table 211, a white communication table 212, and a business information table 213. These pieces of information are similar to the pieces of system information (the business device information table 211, the white communication table 212, and the business information table 213) illustrated in FIG. 3, and thus, description thereof is omitted. The countermeasure support device 100 refers to these pieces of information in generating the countermeasure and calculating the influence-on-business value for the generated countermeasure.

The system information management unit 120 manages the business device information table 211, the white communication table 212, and the business information table 213. The pieces of system information may be shared and managed between the communication monitoring device 20 and the countermeasure support device 100.

The detection information reception unit 130 receives the detection information sent from communication monitoring device 20.

Based on the detection information, the countermeasure generation unit 140 specifies a business having a possibility of being influenced by unauthorized communication of the detection information, and generates one or more countermeasures against the unauthorized communication. Specifically, based on the detection information and the pieces of system information (the business device information table 211, the white communication table 212, and the business information table 213) stored in the storage unit 110, the countermeasure generation unit 140 specifies a business device related to the unauthorized communication and a business having a possibility of being influenced by the unauthorized communication. The countermeasure generation unit 140 obtains the influence-on-business value when the generated countermeasure is implemented. When any countermeasure is currently being implemented for a certain business, the countermeasure generation unit 140 obtains an influence-on-business value by adding an influence value when a newly generated countermeasure is implemented to a total value of influence values of all countermeasures being implemented. Details of a method for calculating the influence-on-business value will be described later. The countermeasure generation unit 140 may give recommendation orders to the generated countermeasures in consideration of an operation status of the business device and an implementation status of the business, may present each countermeasure and each recommendation order to the administrator 2, and may cause the administrator 2 to select the recommendation order desired to be implemented via the user interface.

The automatic implementation propriety determination unit 150 determines whether or not the countermeasure can be automatically implemented by comparing the influence-on-business value of the countermeasure with a preset threshold value. When it is determined that the countermeasure can be automatically implemented, the automatic implementation propriety determination unit 150 transmits a countermeasure command to the countermeasure execution device 30. On the other hand, when it is determined that the automatic implementation of the countermeasure is impossible, the automatic implementation propriety determination unit 150 generates countermeasure information which is information including the contents of the countermeasure, information indicating the business influenced by the implementation of the countermeasure, the influence-on-business value of the countermeasure, and the like, transmits the generated countermeasure information to the administrator device 40, and receives the intention indicating whether or not to implement the countermeasure.

The countermeasure command transmission unit 160 transmits the countermeasure command to the countermeasure execution device 30 when the countermeasure is implemented.

The countermeasure information transmission unit 170 transmits the countermeasure information to the administrator device 40 when the countermeasure is not automatically implemented.

Figure 5:
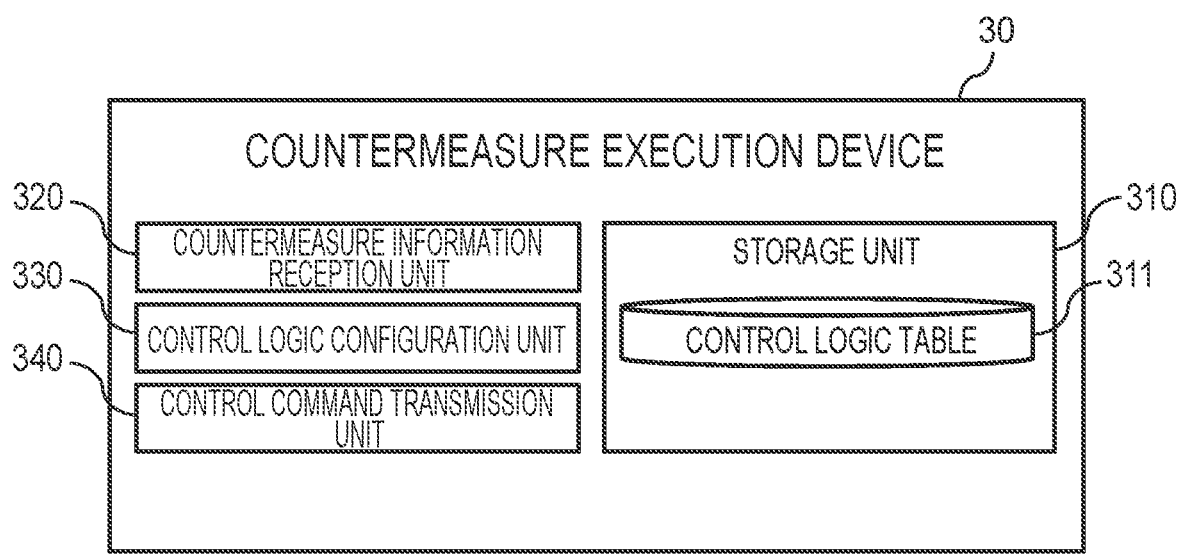
FIG. 5 is a block diagram for describing main functions of a countermeasure execution device.

FIG. 5 is a block diagram for describing main functions of the countermeasure execution device 30. The countermeasure execution device 30 receives the countermeasure command from the countermeasure support device 100 and transmits the control command and the control logic (a control sequence of the controller 61 achieved by executing predetermined processing and calculation) to the countermeasure business device based on the received countermeasure command.

As illustrated in the drawing, the countermeasure execution device 30 has functions of a storage unit 310, a countermeasure information reception unit 320, a control logic configuration unit 330, and a control command transmission unit 340.

Among the above functions, the storage unit 310 stores a control logic table 311 in which information regarding the control command and the control logic corresponding to each of the business devices of the monitoring target system 5 is managed.

The countermeasure information reception unit 320 receives the countermeasure command sent from the countermeasure support device 100 via the communication device 16 and inputs the received countermeasure command to the control logic configuration unit 330.

The control logic configuration unit 330 acquires, from the control logic table 311, the control command and the control logic to be transmitted to the countermeasure business device corresponding to the countermeasure command input from the countermeasure information reception unit 320, and inputs, as the countermeasure command, the acquired control command and control logic to the control command transmission unit 340.

The control command transmission unit 340 transmits the countermeasure command input from the control logic configuration unit 330 to the countermeasure business device, and causes the countermeasure business device to execute processing for the countermeasure. The control command transmission unit 340 may receive information indicating a result of the processing from the countermeasure business device and may transfer the received information to the countermeasure support device 100. As a result, the countermeasure support device 100 can grasp an implementation status of the countermeasure in the countermeasure business device. In this case, the countermeasure support device 100 may transmit information indicating the grasped implementation status to the administrator device 40, and the administrator device 40 may receive the information and present the contents thereof to the administrator 2. As a result, the administrator 2 can efficiently grasp the implementation status of the countermeasure.

Next, processing performed in the security management system 1 will be described.

FIG. 10 is a sequence diagram for describing processing (hereinafter, referred to as an "unauthorized communication monitoring processing S1000") performed by the security management system 1 when the unauthorized communication in the monitoring target system 5 is monitored. Hereinafter, the unauthorized communication monitoring processing S1000 will be described with reference to the drawing.

The communication monitoring device 20 acquires packets flowing through the information system network 51 and the control system network 52 via the mirror port 41 and the mirror port 42, respectively, and monitors whether or not the unauthorized communication is performed in the monitoring target system 5 in real time (S1010: NO). When the unauthorized communication is detected (S1010: YES), the communication monitoring device 20 transmits the detection information of the unauthorized communication to the countermeasure support device 100.

The unauthorized communication refers to, for example, communication of contents not compatible with the contents of the control information table 214 among the communication of the communication path present in the white communication table 212. Examples of the communication of the above incompatible contents include the following communication.

(1) Communication using a control protocol other than the control protocol stored in the control protocol 912 of the control information table 214 (communication deviating from an available control protocol)

(2) Communication using a control command other than the control command stored in the control command 913 of the control information table 214 (communication deviating from an available control command)

(3) Communication using a control parameter other than the control parameter stored in the control parameter 914 of the control information table 214 (communication deviating from an available control parameter)

(4) Communication whose communication period greatly deviates from the communication period stored in the communication period 915 of the control information table 214 (communication performed in a communication period exceeding a preset allowable range)

In the present embodiment, for example, communication performed through a communication path that is not present in the white communication table 212 is blocked by other security countermeasure mechanisms such as routing setting, a firewall, and security countermeasure software.

The detection information includes, for example, the communication path ID of the communication path of the unauthorized communication, and information indicating unauthorized specific contents (deviating control protocol, deviating control command, deviating control parameter, deviating communication period).

Upon receiving the detection information from the communication monitoring device 20, the countermeasure support device 100 executes processing of calculating the influence-on-business value (hereinafter, referred to as "influence-on-business value calculation processing S1011"), generates the countermeasure against the unauthorized communication in the received detection information, and calculates the influence-on-business value when the countermeasure is implemented. Details of the influence-on-business value calculation processing S1011 will be described later.

Subsequently, the countermeasure support device 100 determines whether or not to automatically implement the generated countermeasure (S1012). Specifically, the countermeasure support device 100 determines to automatically implement the countermeasure when the influence-on-business value obtained in the influence-on-business value calculation processing S1011 is less than a preset threshold value (influence-on-business value<threshold value) (S1012: YES), and determines not to automatically implement the countermeasure when the influence-on-business value obtained in the influence-on-business value calculation processing S1011 is equal to or greater than the preset threshold value (influence-on-business value≧threshold value) (S1012: NO).

When it is determined to automatically implement the countermeasure (S1012: YES), the countermeasure support device 100 generates the countermeasure command corresponding to the countermeasure and transmits the generated countermeasure command to the countermeasure execution device 30 (S1017). Upon receiving the countermeasure command from the countermeasure support device 100, the countermeasure execution device 30 generates the control command and transmits the generated control command to the countermeasure business device (S1018). Upon receiving the control command, the countermeasure business device executes control corresponding to the control command (S1019).

On the other hand, when it is determined not to automatically implement the countermeasure (S1012: NO), the countermeasure support device 100 generates the countermeasure information and transmits the generated countermeasure information to the administrator device 40. Upon receiving the countermeasure information, the administrator device 40 presents the contents of the received countermeasure information to the administrator 2 and accepts the input of the intention indicating whether or not to implement the countermeasure (S1013). The administrator 2 checks the contents of the presented countermeasure information and inputs a determination result as to whether or not to implement the countermeasure to the administrator device 40 (S1014). The administrator device 40 transmits the input contents (hereinafter, referred to as a "determination result".) to the countermeasure support device 100 (S1015).

Figure 12:
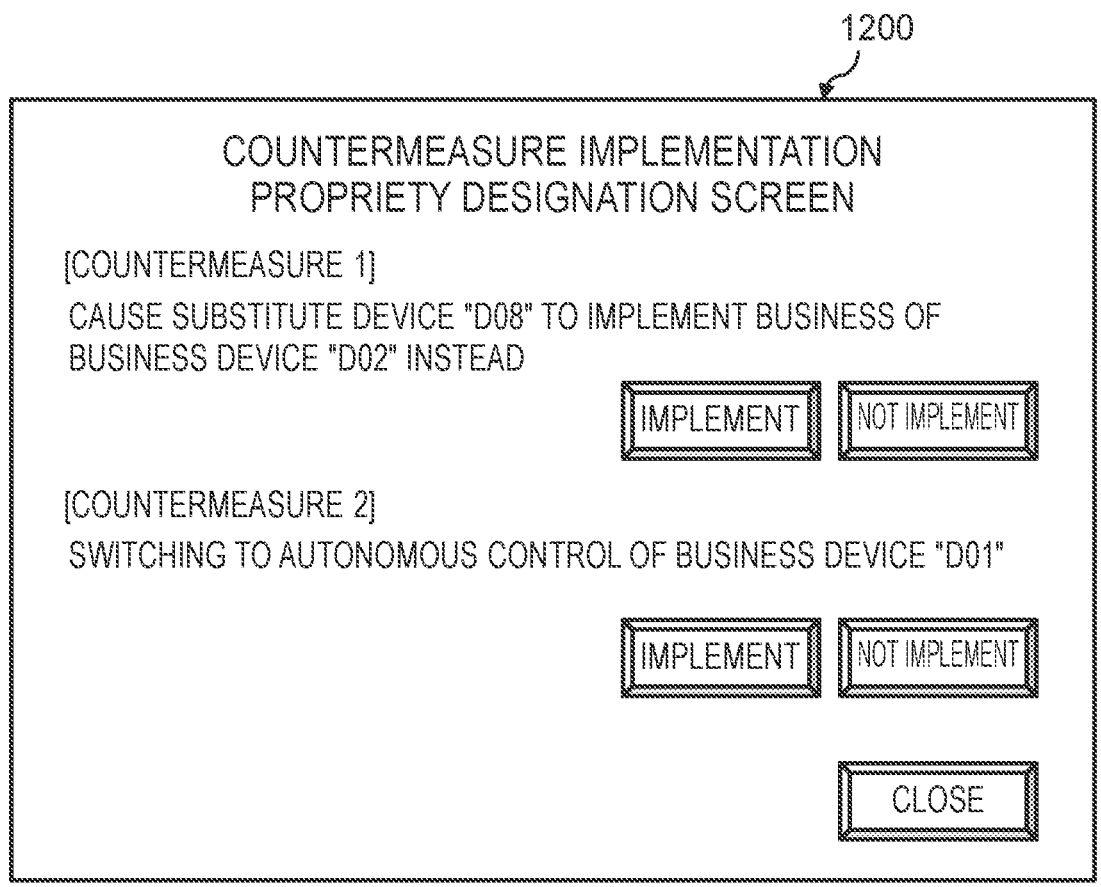
FIG. 12 is an example of a countermeasure implementation propriety designation screen.

FIG. 12 illustrates an example of a screen (hereinafter, referred to as a "countermeasure implementation propriety designation screen 1200".) displayed by the countermeasure support device 100 when the intention indicating whether or not to implement the countermeasure is accepted from the administrator 2 in S1013. On the illustrated countermeasure implementation propriety designation screen 1200, the intention indicating whether or not to implement each countermeasure is accepted from the administrator 2 by presenting two countermeasures and urging operations of buttons ("implement" and "not implement") denoted by reference signs 1211 and 1212. On the countermeasure implementation propriety designation screen 1200, the name of the business influenced by implementing the countermeasure and the magnitude of the influence on the business (influence-on-business value) may be displayed together with the countermeasure. It is possible to support the administrator 2 in selecting the countermeasure and determining the implementation by displaying these pieces of information.

Referring back to FIG. 10, upon receiving the determination result from the administrator device 40, the countermeasure support device 100 determines whether or not to implement the countermeasure based on the contents of the received determination result (S1016). When it is determined to implement the countermeasure, the countermeasure support device 100 generates the countermeasure command corresponding to the countermeasure and transmits the generated countermeasure command to the countermeasure execution device 30 (S1017). As described above, upon receiving the countermeasure command, the countermeasure execution device 30 generates the control command and transmits the generated control command to the business device (S1018). Upon receiving the control command, the business device performs control corresponding to the control command (S1019).

Figure 11:
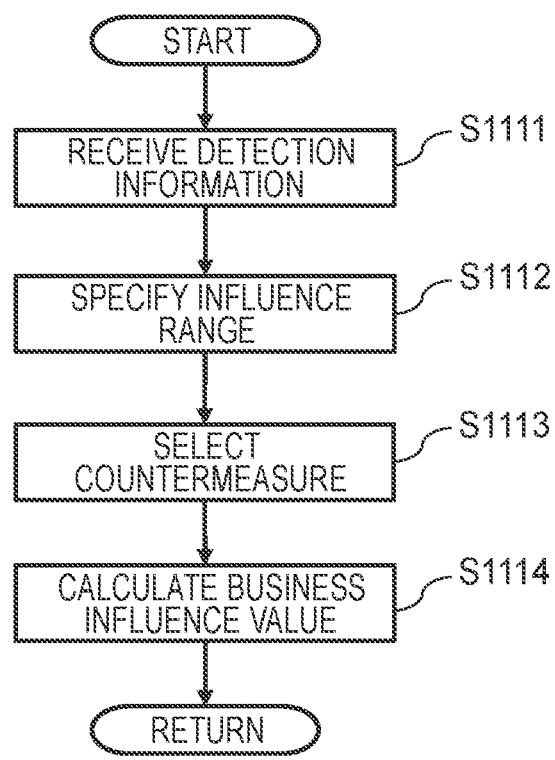
FIG. 11 is a flowchart for describing influence-on-business value calculation processing.

FIG. 11 is a flowchart for describing details of the influence-on-business value calculation processing S1011 in FIG. 10. Hereinafter, the influence-on-business value calculation processing S1011 will be described with reference to the drawing.

First, the countermeasure support device 100 receives the detection information from the communication monitoring device 20 (S1111).

Subsequently, the countermeasure support device 100 specifies an influence range (the business device having a possibility of being influenced by the unauthorized communication) of the unauthorized communication described in the received detection information on the monitoring target system 5 (S1112). Specifically, first, the countermeasure support device 100 specifies the communication path of the unauthorized communication by comparing information (transmission source addresses, destination addresses, transmission source ports, and destination ports) regarding the communication path of the unauthorized communication included in the detection information with the white communication table 212. Subsequently, the countermeasure support device 100 specifies the business using the specified communication path from the business information table 213. Subsequently, the countermeasure support device 100 specifies the business device that executes the specified business by comparing the specified business with the business device information table 211.

Subsequently, the countermeasure support device 100 generates one or more implementable countermeasures for the business device specified in S1112 (S1113). For example, the countermeasure support device 100 determines whether or not the specified business device has the substitute device while referring to the business device information table 211. When the specified business device has the substitute device, the countermeasure support device 100 generates a countermeasure of "implementing the business instead of the specified business device". For example, the countermeasure support device 100 determines whether or not the specified business device can be autonomously controlled while referring to the business device information table 211. When the specified business device can be autonomously controlled, the countermeasure support device 100 generates a countermeasure of "switching the specified business device to autonomous control and separating the business device from the communication path being used". For example, the countermeasure support device 100 may generate a countermeasure in accordance with the contents of the unauthorized communication. For example, the countermeasure support device 100 may accumulate and manage information including a history of past unauthorized communication and a history of the countermeasure performed for the unauthorized communication, and may generate a countermeasure based on the information (for example, by using a machine learning model in which a history is learned).

Subsequently, the countermeasure support device 100 obtains the influence-on-business value for the generated countermeasure (S1114). First, the countermeasure support device 100 obtains the influence value based on the following Equation.

[Math. 1]

$$\text{influence value} = \text{influence criterion} \times \text{business communication importance} \times \text{business operation state} \quad \text{(Equation 1)}$$

The influence criterion in the above Equation is a base value of the influence of the countermeasure on the business, and is a value set in advance by the administrator 2 for each business performed in the monitoring target system 5. In this example, the influence criterion takes values from "0" to "1" (the larger the value, the greater the influence on the business). For example, when communication necessary for the business becomes impossible, such as when the control communication is interrupted or the device is stopped, "1" is set as the influence criterion. For example, when the countermeasure is the degeneration running or the autonomous control, since the influence on the business is limited, an intermediate value such as "0.5" is set as the influence criterion. When a substitute countermeasure is switching to the substitute device, since the business can be continued, "0" is set as the influence criterion. A value of the influence criterion may be adjusted in accordance with a value of the business priority 814 in the business information table 213 (for example, the higher the business priority, the larger the value of the influence criterion) (see FIG. 8).

The business communication importance in the above Equation is a value of the business communication importance 717 in the white communication table 212 of the communication path specified in S1112 having a possibility of being influenced by implementing the countermeasure, and values of "0" to "1" ("1" has a highest importance, and "0" has a lowest importance) are set as described above.

A value of either "1" or "0" is set to the business operation state in the above Equation. The business operation state is set to "1" when the business (the business using the communication path having a possibility of being influenced when the countermeasure is implemented) is being currently operated, and the business operation state is set to "0" when the business is not being currently operated. As described above, when the business is being currently operated, since there is a possibility that the business is influenced, the influence value obtained from Equation 1 is a value other than "0". The countermeasure support device 100 acquires the business operation state of the business by, for example, comparing the operation time length 312 of the business information table 213 with the current time.

Subsequently, the countermeasure support device 100 acquires an influence-on-business value$_n$ of the countermeasure being currently implemented for the business influenced by the unauthorized communication specified in S1112. When there is no countermeasure currently being implemented for the business, the influence-on-business value$_n$ is "0", and in this case, the influence value is an influence-on-business value$_{n+1}$.

Subsequently, the countermeasure support device 100 obtains the influence-on-business value$_{n+1}$ by adding the influence value of the countermeasure generated in S1113 to the influence-on-business value$_n$, which is the sum of the influence values of the countermeasures already being implemented (currently being applied) for the business as represented in the following Equation.

[Math. 2]

$$\text{influence-on-business value}_{n+1} = \text{influence-on-business value}_n + \text{influence value} \quad \text{(Equation 2)}$$

The influence-on-business value calculation processing S1011 is ended as described above, and the processing returns to FIG. 10 with the influence-on-business value$_{n+1}$ obtained from the above Equation as a return value (influence-on-business value), and proceeds to the processing of S1012.

When the countermeasure command is generated in S1017 of FIG. 10 (that is, when a new measure is performed), the countermeasure support device 100 updates the stored influence-on-business value$_n$ with the newly obtained influence-on-business value$_{n+1}$.

As described above in detail, since the security management system 1 according to the present embodiment evaluates the influence of the countermeasure on the business and automatically implements the countermeasure when it is determined that the influence is small, the countermeasure having a small influence on the business can be quickly implemented, and the security performance can be improved. Since the administrator 2 does not need to display the intention, it is possible to reduce the burden on the administrator 2 in this case. When it is determined that the influence on the business is large, since whether or not to implement the countermeasure is determined based on the contents (determination) of the intention of the administrator 2, it is possible to take an appropriate countermeasure to the unauthorized communication while considering the influence on the business.

Although the embodiment has been described above, the present invention is not limited to the above embodiment. The present invention includes various modifications, and may not necessarily include all the configurations described above. Some of the components of a certain embodiment are substituted into the components of another embodiment, and the components of another embodiment can be added to the component of a certain embodiment. Other components can be added, removed, and substituted to, from, and into some of the components of the aforementioned embodiment.

What is claimed is:

1. A security management system comprising a monitoring target system including a plurality of business devices connected to communicate with each other, the security management system comprising:
    an information processing device comprising a processor and a memory;
    wherein information indicating communication paths used for communication between the business devices and a business communication importance which is information indicating an importance of each of the communication paths are stored;
    communication performed in the monitoring target system is monitored;
    when unauthorized communication performed in the monitoring target system is detected, a communication path used for the unauthorized communication is specified, and an influence range of the unauthorized communication on the monitoring target system is specified based on the specified communication path;
    a countermeasure against the unauthorized communication is generated based on the specified influence range;
    the communication path having a possibility of being influenced when the countermeasure is implemented is specified,
    an influence value which is an index indicating a degree of influence of the countermeasure on the business is obtained based on the business communication importance of the specified communication path; and
    whether or not to automatically implement the countermeasure is determined based on the influence value.

2. The security management system according to claim 1, wherein
    when automatically implement the countermeasure is determined, the countermeasure is automatically implemented.

3. The security management system according to claim 1, wherein
    automatically implement the countermeasure is determined when the influence value is less than a preset threshold value, and not to automatically implement the countermeasure is determined when the influence value is equal to or greater than the threshold value.

4. The security management system according to claim 1, wherein
    a business operation state which is information indicating whether or not the business using the communication path having a possibility of being influenced when the countermeasure is implemented is being currently operated is managed, and
    the influence value is obtained based on the business communication importance and the business operation state.

5. The security management system according to claim 1, wherein
    when one or more countermeasures are being currently applied to the business, the influence value is obtained by adding an influence value obtained for a countermeasure of newly detected unauthorized communication to a total value of each of influence values of the countermeasures being currently applied.

6. The security management system according to claim 1, wherein
    the influence value is adjusted based on an influence criterion which is a preset value for each business.

7. The security management system according to claim 1, wherein
    the unauthorized communication is at least one of communication deviating from a control protocol available in the communication between the business devices, communication using a control command other than the control protocol available in the communication between the business devices, communication using a control parameter other than a control parameter available in the communication between the business devices, and communication performed in a communication period exceeding a preset allowable range in the communication between the business devices.

8. The security management system according to claim 1, wherein when not to automatically implement the countermeasure is determined,
    contents of the countermeasure are presented via a user interface;
    an input of an intention as to whether or not to implement the countermeasure is accepted; and
    the countermeasure is implemented when an intention of implementing the countermeasure is accepted.

9. The security management system according to claim 1, wherein
the countermeasure is a countermeasure to cause another business device to implement a business being performed by the business device performing communication by using the specified communication path instead.

10. The security management system according to claim 1, wherein
the countermeasure is a countermeasure to separate the business device from the communication path by switching the specified business device to autonomous control.

11. A security management method comprising:
storing information indicating communication paths used for communication between business devices of a monitoring target system including a plurality of business devices connected to communicate with each other and a business communication importance which is information indicating an importance of each of the communication paths;
monitoring communication performed in the monitoring target system;
specifying a communication path used for the unauthorized communication and specifying an influence range of unauthorized communication on the monitoring target system based on the specified communication path when the unauthorized communication performed in the monitoring target system is detected;
generating a countermeasure against the unauthorized communication based on the specified influence range;
specifying the communication path having a possibility of being influenced when the countermeasure is implemented;
obtaining an influence value which is an index indicating a degree of influence of the countermeasure on the business based on the business communication importance of the specified communication path;
determining whether or not to automatically implement the countermeasure based on the influence value; and
automatically implementing the countermeasure when automatically implement the countermeasure is determined.

12. The security management method according to claim 11, further comprising:
by the information processing device,
determining to automatically implement the countermeasure when the influence value is less than a preset threshold value, and not to automatically implement the countermeasure when the influence value is equal to or greater than the threshold value.

13. The security management method according to claim 11, further comprising:
by the information processing device,
managing a business operation state which is information indicating whether or not the business using the communication path having a possibility of being influenced when the countermeasure is implemented is being currently operated; and
obtaining the influence value based on the business communication importance and the business operation state.

14. The security management method according to claim 11, further comprising:
by the information processing device,
obtaining the influence value by adding an influence value obtained for a countermeasure of newly detected unauthorized communication to a total value of each of influence values of countermeasures being currently applied when one or more countermeasures are being currently applied to the business.

15. The security management method according to claim 11, further comprising:
by the information processing device,
adjusting the influence value based on an influence criterion which is a preset value for each business.

* * * * *